(12) United States Patent
Moniruzzaman

(10) Patent No.: US 9,243,118 B2
(45) Date of Patent: Jan. 26, 2016

(54) HIGH MODULUS HIGH STRENGTH HIGH FLOW OSU COMPLIANT POLYETHERIMIDE-CARBON FIBER COMPOSITES FOR METAL REPLACEMENT

(75) Inventor: Mohammad Moniruzzaman, Exton, PA (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 750 days.

(21) Appl. No.: 13/491,559

(22) Filed: Jun. 7, 2012

(65) Prior Publication Data

US 2013/0331505 A1    Dec. 12, 2013

(51) Int. Cl.
*C08K 3/04* (2006.01)
*C08J 5/04* (2006.01)
*C08K 7/06* (2006.01)
*C08L 71/00* (2006.01)
*C08L 79/08* (2006.01)
*B64D 11/06* (2006.01)
*C08G 73/10* (2006.01)

(52) U.S. Cl.
CPC ............. *C08J 5/042* (2013.01); *B64D 11/0638* (2014.12); *B64D 11/0646* (2014.12); *C08K 7/06* (2013.01); *C08L 71/00* (2013.01); *C08L 79/08* (2013.01); *C08G 73/1046* (2013.01); *C08G 73/1053* (2013.01); *C08G 2650/40* (2013.01)

(58) Field of Classification Search
USPC ........................................................ 524/538
See application file for complete search history.

(56) References Cited

U.S. PATENT DOCUMENTS

| | | | |
|---|---|---|---|
| 3,875,116 A | 4/1975 | Heath et al. | |
| 3,976,729 A | 8/1976 | Lewis et al. | |
| 4,005,183 A | * 1/1977 | Singer | 423/447.2 |
| 4,026,788 A | 5/1977 | McHenry | |
| 4,548,997 A | 10/1985 | Mellinger et al. | |
| 4,629,759 A | 12/1986 | Rock | |
| 4,639,486 A | 1/1987 | Liu | |
| 4,774,317 A | 9/1988 | Verbicky, Jr. et al. | |
| 4,816,527 A | 3/1989 | Rock | |
| 5,223,556 A | 6/1993 | Gotoh et al. | |
| 5,917,005 A | 6/1999 | Brunelle et al. | |
| 6,310,145 B1 | 10/2001 | Puyenbroek et al. | |
| 7,230,066 B2 | 6/2007 | Khouri et al. | |
| 2010/0048853 A1 | 2/2010 | Dris et al. | |
| 2011/0263791 A1 | 10/2011 | Chiong et al. | |

FOREIGN PATENT DOCUMENTS

| | | |
|---|---|---|
| EP | 0111327 A1 | 6/1984 |
| EP | 0344327 A1 | 12/1989 |
| EP | 0978529 A1 | 2/2000 |
| JP | H04 13761 A | 1/1992 |
| WO | WO-93/04109 A1 | 3/1993 |
| WO | WO-2005/078008 A1 | 8/2005 |
| WO | WO-2010/025363 A1 | 3/2010 |
| WO | WO-2012054595 A1 | 4/2012 |
| WO | WO-2012/068259 A1 | 5/2012 |

OTHER PUBLICATIONS

International Search Report issued Sep. 24, 2013 by the International Searching Authority for PCT Application PCT/US2013/044670 filed on Jun. 7, 2013, which published as WO 2013/185008 on Dec. 12, 2013 (Inventor—Mohammad Moniruzzaman; Applicant—SABIC Innovative Plastics IP, B.V.) (5 pages).
Database WPI. Week 199209. Thomason Scientific London, GB; AN 1992-069530 (3 pages).
T. Matsumoto, "Mesophase Pitch and Its Carbon Fibers", Pure & Appl. Chem., 1985, vol. 57, No. 11, pp. 1553-1562.

\* cited by examiner

*Primary Examiner* — Ling Choi
*Assistant Examiner* — Thuy-Ai Nguyen
(74) *Attorney, Agent, or Firm* — Baker Hostetler

(57) ABSTRACT

Disclosed herein are fiber reinforced thermoplastic composite with desired physical properties, such as high modulus, high stiffness and high flow while maintaining the OSU heat release compliancy.

9 Claims, No Drawings ic composite exhibits a heat release profile characterized by a 2 minute total heat release less than about 65 kW min/m² and a peak heat release rate less than about 65 kW/m² when measured according to the Ohio State University ("OSU") Heat Release test. In a still further aspect, the present invention relates to articles of manufacturer comprising the fiber reinforced thermoplastic composites.

Disclosed herein are fiber reinforced thermoplastic composites, comprising: a) a continuous thermoplastic polymer phase comprising: i) a thermoplastic resin having a molecular weight of at least about 40,000 Daltons; and ii) a flow modifier; and b) a dispersed phase comprising a plurality of carbon fibers having a tensile modulus in the range of from 38 to 48 million pounds per square inch ("MSI") dispersed within the continuous thermoplastic polymer phase; wherein the composite exhibits a specific modulus of at least about 25; wherein the composite exhibits a tensile strength of at least about 226 MPa; and wherein the composite exhibits a heat release profile characterized by a 2 minute total heat release less than about 65 kW min/m² and a peak heat release rate less than about 65 kW/m² when measured according to the Ohio State University ("OSU") Heat Release test.

Also disclosed herein are fiber reinforced thermoplastic composites, comprising a continuous thermoplastic polymer phase comprising: a) a polyetherimide having a molecular weight of at least 40,000 Daltons; and a polyetheretherketone having a melt viscosity less than 150 Pascal-seconds (Pa-s) when determined under the conditions of 400° C. and a shear rate of 1000/s; and b) a dispersed phase comprising a plurality of carbon fibers having a tensile modulus in the range of from 38 to 48 MSI dispersed within the continuous thermoplastic polymer phase; and wherein the composite exhibits a specific modulus of at least about 25; wherein the composite exhibits a tensile strength of at least about 226 MPa; wherein the composite exhibits a melt mass-flow rate ("MFR") of at least 10 g/min when determined under the conditions of 380° C. and 6.6 kg mass; and wherein the composite exhibits a heat release profile characterized by a 2 minute total heat release less than about 65 kW min/m² and a peak heat release rate less than about 65 kW/m² when measured according to the Ohio State University ("OSU") Heat Release test.

Also disclosed herein are fiber reinforced thermoplastic composites, comprising: a) a continuous thermoplastic polymer phase comprising: i) a polyetherimide having a molecular weight of at least about 40,000 Daltons, wherein the polyetherimide resin is present in the composite in an amount that does not exceed about 60 wt % of the composite; and ii) a polyetheretherketone having a melt viscosity less than 150 Pascal-seconds (Pa-s) when determined under the conditions of 400° C. and a shear rate of 1000/s, wherein the polyetheretherketone is present in the composite in an amount in the range of from about 10 wt % to about 60 wt % of the continuous thermoplastic polymer phase; and b) a dispersed phase comprising a plurality of carbon fibers having a tensile modulus in the range of from 38 to 48 MSI dispersed within the continuous thermoplastic polymer phase, wherein the plurality of carbon fibers are present in an amount that is at least about 35 wt % of the total weight of the composite.

Also disclosed are methods for the manufacture of a fiber-reinforced thermoplastic composition, comprising the steps of: a) providing thermoplastic resin composition comprising: i) a thermoplastic resin having a molecular weight of at least about 40,000 Daltons; and ii) a flow modifier; b) introducing a plurality of carbon fibers having a tensile modulus in the range of from 38 to 48 MSI into the thermoplastic resin composition to form a fiber reinforced thermoplastic composite precursor composition having a melt mass-flow rate ("MFR") of at least 10 g/min when determined under the conditions of 380° C. and 6.6 kg mass; and c) forming a fiber reinforced thermoplastic composite from the precursor composition; and wherein the formed fiber reinforced thermo-

HIGH MODULUS HIGH STRENGTH HIGH FLOW OSU COMPLIANT POLYETHERIMIDE-CARBON FIBER COMPOSITES FOR METAL REPLACEMENT

FIELD OF INVENTION

The present invention relates to fiber reinforced thermoplastic composites, and methods of making same, wherein the fiber reinforced thermoplastic composites comprise a continuous thermoplastic polymer phase and a disperse phase comprising a plurality of carbon fibers dispersed in the continuous thermoplastic polymer phase, and the continuous thermoplastic polymer phase comprising a thermoplastic resin and a flow modifier.

BACKGROUND

Metal replacement with lightweight materials is a major focus of the airline industry to achieve fuel economy. Short carbon fiber reinforced thermoplastic composites possess great potential for metal replacement as they are lightweight, injection moldable and the stiffness and strength of the composites can be tuned by adjusting the carbon fiber type and loading in the composites. There are two major challenges with short carbon fiber thermoplastic composites in metal replacement applications in aircrafts. For aircraft interior application, the material must pass the flammability tests that include a vertical Bunsen burner test, a heat release test and a smoke test. Historically, the heat release test, which is also known as the OSU (Ohio State University) test, is the most difficult test to pass with the thermoplastics. Secondly, it requires a high loading of the carbon fibers in the thermoplastics to meet the stiffness and strength requirements of the load bearing parts where aluminum or other metals are currently being used. This high loading of carbon fibers causes a significant increase in melt viscosity of the composites that creates processing difficulties. The challenge lies in the manipulation of the thermoplastic composites to achieve a combination of high modulus, high stiffness and high flow while maintaining the OSU heat release compliancy.

Accordingly, there is a need for thermoplastic composites, devices thereof and methods thereof that comprise carbon fiber, wherein the thermoplastic composites have high modulus, e.g. similar or greater than the specific modulus of aluminum; high strength, e.g. strength that is similar or greater than that of die-case aluminum; high flow; and are compliant with the OSU 65/65 heat-release parameters. Such thermoplastic composites, devices comprising thermoplastic composites, and methods related thereto are described herein.

SUMMARY

In accordance with the purpose(s) of the present invention, as embodied and broadly described herein, the invention, in one aspect, relates to fiber reinforced thermoplastic composites comprising a continuous thermoplastic polymer phase and a dispersed phase comprising a plurality of carbon fibers dispersed in the continuous thermoplastic polymer phase, and to methods of preparing the fiber reinforced thermoplastic composites. In a further aspect, the fiber reinforced thermoplastic composites have high modulus, high strength, high flow and are compliant with the OSU 65/65 standard, i.e. the composite exhibits a heat release profile characterized by a 2 minute total heat release less than about 65 kW min/m² and a peak heat release rate less than about 65 kW/m² when measured according to the Ohio State University ("OSU") Heat plastic composite exhibits a specific modulus of at least about 25; wherein the formed fiber reinforced thermoplastic composite exhibits a tensile strength of at least about 226 MPa; and wherein the composite exhibits a heat release profile characterized by a 2 minute total heat release less than about 65 kW min/m$^2$ and a peak heat release rate less than about 65 kW/m$^2$ when measured according to the Ohio State University ("OSU") Heat Release test.

Also disclosed herein are articles of manufacturer comprising the fiber reinforced thermoplastic composites described herein.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present invention can be described and claimed in a particular statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

A. Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a nanocomposite" includes mixtures of two or more nanocomposites, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The terms "fiber reinforced thermoplastic composite" and "composite" are used interchangeably herein.

As used herein, the terms "optional" or "optionally" means that the subsequently described event or circumstance can or can not occur, and that the description includes instances where said event or circumstance occurs and instances where it does not.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% weight, it is understood that this percentage is relation to a total compositional percentage of 100%.

The term "specific modulus" and "specific Young's modulus," can be used interchangeably, as used herein refers the elastic modulus per mass density (or modulus per unit mass) of a material. Specific modulus is also known as the stiffness to weight ratio or specific stiffness.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Composites

In accordance with the purpose(s) of the present invention, as embodied and broadly described herein, the invention, in one aspect, relates to fiber reinforced thermoplastic composites comprising a continuous thermoplastic polymer phase and a dispersed phase comprising a plurality of carbon fibers dispersed in the continuous thermoplastic polymer phase, and to methods of preparing the fiber reinforced thermoplastic composites. In a further aspect, the fiber reinforced thermoplastic composites have high modulus, high strength, high flow and are compliant with the OSU 65/65 standard, i.e. the composite exhibits a heat release profile characterized by a 2 minute total heat release less than about 65 kW min/m$^2$ and a peak heat release rate less than about 65 kW/m$^2$ when measured according to the Ohio State University ("OSU") Heat Release test. In a still further aspect, the present invention relates to articles of manufacturer comprising the fiber reinforced thermoplastic composites.

Disclosed herein are fiber reinforced thermoplastic composites, comprising: a) a continuous thermoplastic polymer phase comprising: i) a thermoplastic resin having a molecular weight of at least about 40,000 Daltons; and ii) a flow modifier; and b) a dispersed phase comprising a plurality of carbon fibers having a tensile modulus in the range of from 38 to 48 million pounds per square inch ("MSI") dispersed within the continuous thermoplastic polymer phase; wherein the composite exhibits a specific modulus of at least about 25; wherein the composite exhibits a tensile strength of at least about 226 MPa; and wherein the composite exhibits a heat release profile characterized by a 2 minute total heat release less than about 65 kW min/m$^2$ and a peak heat release rate less than about 65 kW/m$^2$ when measured according to the Ohio State University ("OSU") Heat Release test.

Also disclosed herein are fiber reinforced thermoplastic composites, comprising: a) a continuous thermoplastic polymer phase comprising: a) a polyetherimide having a molecular weight of at least 40,000 Daltons; and a polyetheretherketone having a melt viscosity less than 150 Pascal-seconds (Pa-s) when determined under the conditions of 400° C. and a shear rate of 1000/s; and b) a dispersed phase comprising a plurality of carbon fibers having a tensile modulus in the range of from 38 to 48 MSI dispersed within the continuous thermoplastic polymer phase; and wherein the composite exhibits a specific modulus of at least about 25; wherein the composite exhibits a tensile strength of at least about 226 MPa; wherein the composite exhibits a melt mass-flow rate ("MFR") of at least 10 g/min when determined under the conditions of 380° C. and 6.6 kg mass; and wherein the composite exhibits a heat release profile characterized by a 2 minute total heat release less than about 65 kW min/m$^2$ and a peak heat release rate less than about 65 kW/m$^2$ when measured according to the Ohio State University ("OSU") Heat Release test.

Also disclosed herein are fiber reinforced thermoplastic composites, comprising: a) a continuous thermoplastic polymer phase comprising: i) a polyetherimide having a molecular weight of at least about 40,000 Daltons, wherein the polyetherimide resin is present in the composite in an amount that does not exceed about 60 wt % of the composite; and ii) a polyetheretherketone having a melt viscosity less than 150 Pascal-seconds (Pa-s) when determined under the conditions of 400° C. and a shear rate of 1000/s, wherein the polyetheretherketone is present in the composite in an amount in the range of from about 10 wt % to about 60 wt % of the continuous thermoplastic polymer phase; and b) a dispersed phase comprising a plurality of carbon fibers having a tensile modulus in the range of from 38 to 48 MSI dispersed within the continuous thermoplastic polymer phase, wherein the plurality of carbon fibers are present in an amount that is at least about 35 wt % of the total weight of the composite.

In one aspect, the fiber reinforced thermoplastic composite can contain different amounts of thermoplastic resin, flow modifier and carbon fibers.

In one aspect, the fiber reinforced thermoplastic composite can comprise a thermoplastic resin present in an amount of about 25, 30, 35, 40, 45, 50, 55, or 60 wt % of the composite. In a further aspect, the fiber reinforced thermoplastic composite can comprise a thermoplastic resin present in an amount of about 40, 45, 50, 55, or 60 wt % of the composite. In a still further aspect, the fiber reinforced thermoplastic composite can comprise a thermoplastic resin is present in an amount that does not exceed about 60 wt % of the composite.

In one aspect, the thermoplastic resin is present in an amount in the range of from 20 to 60, 30 to 60, 40 to 60, and 50 to 60 weight percent of the composite. In another aspect, the thermoplastic resin is present in an amount in the range of from 20 to 55, 30 to 55, 40 to 55, and 50 to 55 weight percent of the composite. For example, the thermoplastic resin is present in an amount in the range of 40 to 55 weight percent of the composite.

In one aspect, the fiber reinforced thermoplastic composite comprises a thermoplastic resin is present in an amount that exceed 20, 25, 30, 35, 40, 45, 50, or 55 weight percent of the composite. For example, the fiber reinforced thermoplastic composite comprises a thermoplastic resin is present in an amount that exceed 40, 45, 50, or 55 weight percent of the composite. In a preferred aspect, the fiber reinforced thermoplastic composite comprises a thermoplastic resin is present in an amount that exceed 55 weight percent of the composite.

In one aspect, the fiber reinforced thermoplastic composite can comprise a flow modifier present in an amount of about 10, 15, 20, 25, 30, 35, 40, 45, 50, 55, or 60 wt % of the continuous thermoplastic polymer phase. In a further aspect, the fiber reinforced thermoplastic composite can comprise a flow modifier present in an amount of about 35, 40, 45, 50, 55, or 60 wt % of the continuous thermoplastic polymer phase. In a still further aspect, the fiber reinforced thermoplastic composite comprises a flow modifier present in an amount of about 35 wt % of the continuous thermoplastic polymer phase. In a yet further aspect, the fiber reinforced thermoplastic composite comprises a flow modifier present in an amount between about 20 to about 60 wt %, about 30 to about 60 wt %, about 40 to about 60 wt %, or about 50 to about 60 wt % of the continuous thermoplastic polymer phase. In an even further aspect, the fiber reinforced thermoplastic composite comprises a flow modifier present in an amount between about 30 to about 50 wt % or about 35 to about 45 wt % of the continuous thermoplastic polymer phase.

In one aspect, the fiber reinforced thermoplastic composite comprises carbon fibers, such as a plurality of carbon fibers. In a further aspect, the carbon fibers are chopped carbon fibers. In a still further aspect, the carbon fibers are present in an amount that is at least about 35 wt %, about 40 wt %, about 45 wt %, about 50 wt %, about 55 wt %, or about 60 wt % of the total weight of the composite. In a yet further aspect, the carbon fibers are present in an amount that of about 35, about 40, about 45, or about 50 wt % of the total weight of the composite. In an even further aspect, the carbon fibers can be present in an amount that is about 35 wt % to about 60% of the total weight of the composite. In a still further aspect, the carbon fibers can be present in an amount that is about 45 wt % to about 60% of the total weight of the composite. In a yet further aspect, the carbon fibers can be present in an amount that is about 55 wt % to about 60% of the total weight of the composite. In an even further aspect, the carbon fibers can be present in an amount that is about 35 wt % to about 55% of the total weight of the composite. In a still further aspect, the carbon fibers can be present in an amount that is about 35 wt % to about 50% of the total weight of the composite. In a yet further aspect, the carbon fibers can be present in an amount that is about 35 wt % to about 45% of the total weight of the composite.

In one aspect, the fiber reinforced thermoplastic composite exhibits a specific modulus of at least about 25, about 30, about 35, or about 40. In a further aspect, the fiber reinforced thermoplastic composite can exhibit a specific modulus of at least about 25. In a still further aspect, the fiber reinforced thermoplastic composite can exhibit a specific modulus of at least about 27. In a yet further aspect, the fiber reinforced thermoplastic composite can exhibit a specific modulus of at least about 29. In an even further aspect, the fiber reinforced thermoplastic composite can exhibit a specific modulus of at least about 30.

In one aspect, the composite exhibits a tensile strength of at least about 220 MPa, about 226 MPa, about 230 MPa, about 230 MPa, about 240 MPa, about 245 MPa, or about 250 MPa. In a further aspect, the composite exhibits a tensile strength of at least about 226 MPa. In a still further aspect, the composite exhibits a tensile strength of at least about 230 MPa. In a yet further aspect, the composite exhibits a tensile strength of at least about 235 MPa.

In one aspect, the composite can exhibit a heat release profile, as measured according to the Ohio State University ("OSU") Heat Release test. In a further aspect, it can be characterized by a 2 minute total heat release less than about 40, about 45, about 50, about 55, about 60 or about 65 kW min/m² and a peak heat release rate less than about 40, about 45, about 50, about 55, about 60 or about 65 kW/m². In a still further aspect, the composite is characterized by a 2 minute total heat release less than 40 kW min/m² and a peak heat release rate less than 40 kW/m². In a still further aspect, the composite is characterized by a 2 minute total heat release less than 65 kW min/m² and a peak heat release rate less than 65 kW/m².

In one aspect, the composite further exhibits a melt mass-flow rate ("MFR") of at least about 10 g/min when determined under the conditions of 380° C. and 6.6 kg mass. In a further aspect, the composite further exhibits a melt mass-flow rate ("MFR") of at least about 12 g/min when determined under the conditions of 380° C. and 6.6 kg mass. In a still further aspect, the composite further exhibits a melt mass-flow rate ("MFR") of at least about 10 g/min, about 11 g/min, about 12 g/min, about 13 g/min, about 14 g/min, about 15 g/min, about 16 g/min, about 17 g/min, about 18 g/min, about 19 g/min, about 20 g/min, about 21 g/min, about 22 g/min, about 23 g/min, about 24 g/min, about 25 g/min, about 26 g/min, about 27 g/min, about 28 g/min, about 29 g/min, or about 30 g/min when determined under the conditions of 380° C. and 6.6 kg mass In a further aspect, the fiber reinforced thermoplastic composites comprises 40% carbon fiber, 48% ULTEM™ 1000, and 12% PEEK 90P.

C. Thermoplastic Polymer Phase

In one aspect, the thermoplastic polymer phase comprises a thermoplastic resin and a flow modifier. The thermoplastic resin can comprises one or more thermoplastic polymer resins including, but are not limited to, polyphenylene sulfides and polyimides. In a further aspect, the polyimides used in the disclosed composites include polyamideimides, polyetherimides and polybenzimidazoles. In a further aspect, polyetherimides comprise melt processable polyetherimides.

Suitable polyetherimides that can be used in the disclosed composites include, but are not limited to, ULTEM™. ULTEM™ is a polymer from the family of polyetherimides (PEI) sold by Saudi Basic Industries Corporation (SABIC). ULTEM™ can have elevated thermal resistance, high strength and stiffness, and broad chemical resistance. ULTEM™ as used herein refers to any or all ULTEM™ polymers included in the family unless otherwise specified. In a further aspect, the ULTEM™ is ULTEM™ 1000. In one aspect, a polyetherimide can comprise any polycarbonate material or mixture of materials, for example, as recited in U.S. Pat. Nos. 4,548,997; 4,629,759; 4,816,527; 6,310,145; and 7,230,066, all of which are hereby incorporated in its entirety for the specific purpose of disclosing various polyetherimide compositions and methods.

In certain aspects, the thermoplastic polymer is a polyetherimide polymer having a structure comprising structural units represented by a organic radical of formula (I):

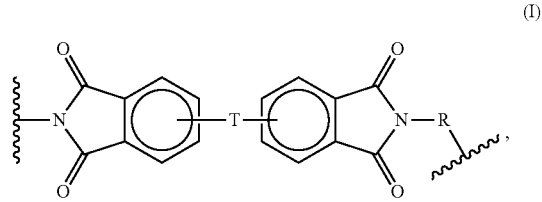

(I)

wherein R in formula (I) includes substituted or unsubstituted divalent organic radicals such as (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (II):

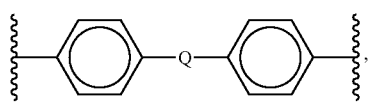
(II)

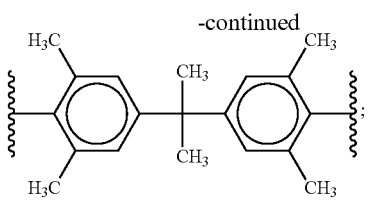

wherein Q includes a divalent moiety selected from the group consisting of —O—, —S—, —C(O)—, —SO2-, —SO—, —CyH2y- (y being an integer from 1 to 5), and halogenated derivatives thereof, including perfluoroalkylene groups; wherein T is —O— or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula (III):

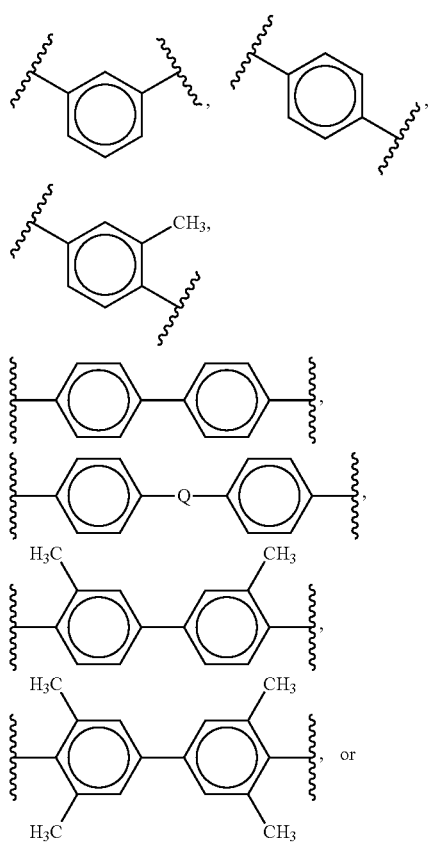
(III)

and wherein the polyetherimides which are included by formula (I) have a Mw of at least about 40,000.

In a further aspect, the polyetherimide polymer may be a copolymer, which, in addition to the etherimide units described above, further contains polyimide structural units of the formula (IV):

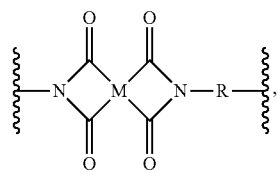
(IV)

wherein R is as previously defined for formula (I) and M includes, but is not limited to, radicals of formula (V):

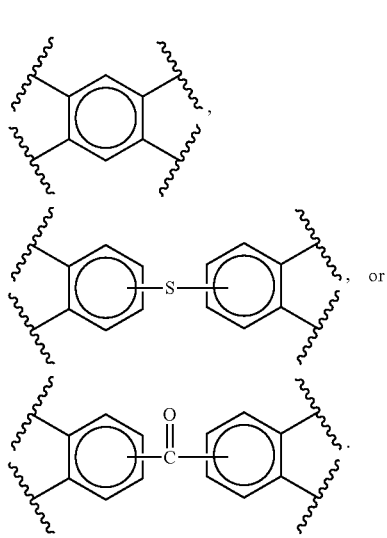
(V)

In a further aspect, the thermoplastic resin is a polyetherimide polymer having structure represented by a formula:

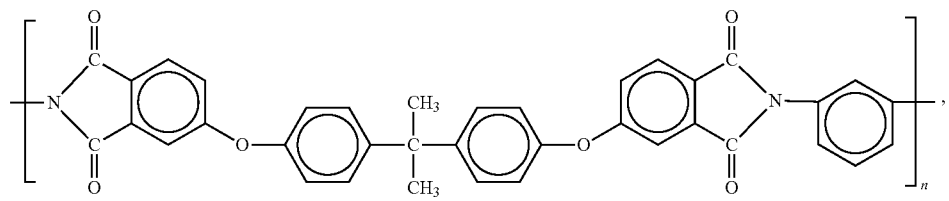

wherein the polyetherimide polymer has a molecular weight of at least 40,000 Daltons, 50,000 Daltons, 60,000 Daltons, 80,000 Daltons, or 100,000 Daltons.

The polyetherimide polymer can be prepared by methods known to one skilled in the art, including the reaction of an aromatic bis(ether anhydride) of the formula (VI):

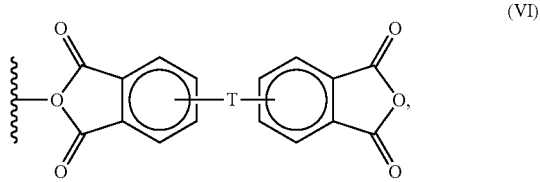

with an organic diamine of the formula (IX):

$$H_2N—R—NH_2 \quad (VII),$$

wherein T and R are defined as described above in formula (I).

Illustrative, non-limiting examples of aromatic bis(ether anhydride)s of formula (VI) include 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent. A useful class of aromatic bis(ether anhydride)s included by formula (VI) above includes, but is not limited to, compounds wherein T is of the formula (VIII):

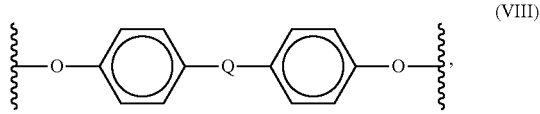

and the ether linkages, for example, are beneficially in the 3,3', 3,4', 4,3', or 4,4' positions, and mixtures thereof, and where Q is as defined above.

Any diamino compound may be employed in the preparation of the polyimides and/or polyetherimides. Illustrative, non-limiting examples of suitable diamino compounds of formula (VII) include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecane diamine, 1,18-octadecanediamine, 3-methylheptamethylenediamine, 4,4-dimethylheptamethylenediamine, 4-methylnonamethylenediamine, 5-methylnonamethylene diamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylene diamine, 1,2-bis(3-aminopropoxy) ethane, bis(3-aminopropyl) sulfide, 1,4-cyclohexane diamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(b-amino-t-butyl) toluene, bis (p-b-amino-t-butylphenyl)ether, bis(p-b-methyl-o-aminophenyl)benzene, bis(p-b-methyl-o-aminopentyl)benzene, 1,3-diamino-4-isopropyl benzene, bis(4-aminophenyl) sulfide, bis(4-aminophenyl) sulfone, bis(4-aminophenyl)ether and 1,3-bis(3-aminopropyl)tetramethyldisiloxane. Mixtures of these compounds may also be present. Beneficial diamino compounds are aromatic diamines, especially m- and p-phenylenediamine and mixtures thereof.

In a further aspect, the polyetherimide resin includes structural units according to formula (I) wherein each R is independently p-phenylene or m-phenylene or a mixture thereof and T is a divalent radical of the formula (IX):

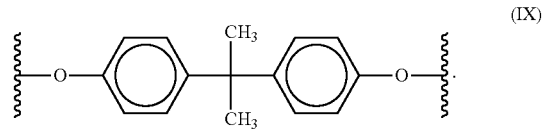

In various aspects, the reactions can be carried out employing solvents such as o-dichlorobenzene, m-cresol/toluene, or the like, to effect a reaction between the anhydride of formula (VI) and the diamine of formula (VII), at temperatures of about 100° C. to about 250° C. Alternatively, the polyetherimide can be prepared by melt polymerization of aromatic bis(ether anhydride)s of formula (VI) and diamines of formula (VII) by heating a mixture of the starting materials to elevated temperatures with concurrent stirring. Melt polymerizations can employ temperatures of about 200° C. to about 400° C. Chain stoppers and branching agents can also be employed in the reaction. The polyetherimide polymers can optionally be prepared from reaction of an aromatic bis (ether anhydride) with an organic diamine in which the diamine is present in the reaction mixture at no more than about 0.2 molar excess, and beneficially less than about 0.2 molar excess. Under such conditions the polyetherimide resin has less than about 15 microequivalents per gram (μeq/g) acid titratable groups in one embodiment, and less than about 10 μeq/g acid titratable groups in an alternative embodiment, as shown by titration with chloroform solution with a solution of 33 weight percent (wt %) hydrobromic acid in glacial acetic acid. Acid-titratable groups are essentially due to amine endgroups in the polyetherimide resin.

In a further aspect, the polyetherimide resin has a weight average molecular weight (Mw) of at least about 40,000 to about 150,000 grams per mole (g/mole), as measured by gel permeation chromatography, using a polystyrene standard. In a still further aspect, the thermoplastic resin can have a molecular weight of at least 40,000 Daltons, 50,000 Daltons, 60,000 Daltons, 80,000 Daltons, or 100,000 Daltons. In a yet further aspect, the thermoplastic resin can have a molecular weight of at least 40,000 Daltons. In an even further aspect, the thermoplastic resin can have a molecular weight of at least 45,000 Daltons. In a still further aspect, the thermoplastic resin can have a molecular weight of at least 50,000 Daltons. In a yet further aspect, the thermoplastic resin can have a molecular weight of at least 60,000 Daltons. In an even further aspect, the thermoplastic resin can have a molecular weight of at least 70,000 Daltons. In a still further aspect, the thermoplastic resin can have a molecular weight of at least 100,000 Daltons.

In a further aspect, the thermoplastic resin can comprise a polyetherimide polymer having a molecular weight of at least 40,000 Daltons, 50,000 Daltons, 60,000 Daltons, 80,000 Daltons, or 100,000 Daltons. In a yet further aspect, polyetherimide polymer has a molecular weight of at least Daltons, 40,000 Daltons or 50,000 Daltons. In a still further aspect, the polyetherimide polymer has a molecular weight of at least 40,000 Daltons. In a yet further aspect, the polyetherimide polymer has a molecular weight of at least 50,000 Daltons. In an even further aspect, the polyetherimide polymer has a molecular weight of at least 60,000 Daltons. In a still further aspect, the polyetherimide polymer has a molecular weight of at least 70,000 Daltons. In a yet further aspect, the polyetherimide polymer has a molecular weight of at least 100,000 Daltons.

D. Flow Modifier

In one aspect, the fiber reinforced thermoplastic composite can comprise a flow modifier. In a further aspect, the flow modifier can be a polymer. In a still further aspect, the flow modifier is a polyetherketone ("PEK"), a polyaryletherketone ("PAEK"), or a polyetheretherketone ("PEEK"). In a yet further aspect, the flow modifier is a PEEK. For example, a PEEK useful as a flow modifier in the disclosed composites is Victrex PEEK 90P. Victrex PEEK 90P is a patented product sold by Victrex plc and described in U.S. Pat. No. 7,906,574, which is incorporated in its entirety for the specific purpose of disclosing various PEEK compositions and methods. It is a semicrystalline polymer having a melt viscosity of 90 pa.s when determined under the conditions of 400° C. and a shear rate of 1000/s.

In one aspect, the flow modifier can have a melt viscosity less than about 75, about 80, about 90, about 100, about 125, or about 150. In a further aspect, the flow modifier has a melt viscosity less than about 90, about 100, about 125 or about 150 Pa-s. In a yet further aspect, the flow modifier has a melt viscosity less than about 150 Pa-s. In an even further aspect, the flow modifier has a melt viscosity less than about 100 Pa-s. In a still further aspect, the flow modifier has a melt viscosity less than about 90 Pa-s. The Pa-s values are determined at a shear rate of 1000/s.

E. Carbon Fibers

The carbon fibers suitable for use in the manufacture of the disclosed composites are intermediate modulus (IM) carbon fibers having a tensile modulus in the range of from about 38 MSI to about 48 MSI. In contrast, conventional electrostatic dissipative composites are typically loaded with carbon fibers having a tensile modulus below about 38 MSI. For example, polyacrylonitrile based standard modulus carbon fibers typically exhibit a tensile modulus value of about 29 to about 35 MSI. In one aspect, the intermediate modulus fibers suitable for use in the manufacture of the disclosed composites have a tensile modulus in the range of from about 40 MSI to about 44 MSI. For example, an intermediate modulus carbon fiber can have a tensile modulus of about 42 MSI.

As one of ordinary skill in the art will appreciate, most commercially available carbon fibers are typically produced through controlled pyrolysis of polyacrylanitrile fibers, also known as PAN fibers. When compared to the manufacture of standard modulus carbon fibers such as those described above, intermediate modulus carbon fibers are exposed to higher heat treatments during their manufacture which results in an improved alignment of the grapheme layers within the fiber. This higher heat treatment can also increase the porosity in the fiber structure and thus can also result in discontinuation between the graphene layers of the fiber. Without wishing to be bound by theory, it is believed this discontinuation between the graphene layers also results in the different percolation curve behavior exhibited by the intermediate modulus carbon fibers utilized to manufacture the disclosed composites.

Non-limiting examples of commercially available intermediate modulus carbon fibers include HexTow® IM7, commercially available from the Hexcel Corporation, and having a tensile modulus of about 40 MSI and TORAYCA® T800S, commercially available from Toray Carbon Fibers America, Inc., (a wholly owned subsidiary of Toray Industries, Inc.) and having a tensile modulus of about 42 MSI.

F. Methods

Also disclosed herein are methods for the manufacturer of composites, such as fiber reinforced thermoplastic composites. In one aspect, the methods can manufacturer the fiber reinforced thermoplastic composites described elsewhere herein.

Also disclosed are methods for the manufacture of a fiber-reinforced thermoplastic composition, comprising the steps of: a) providing thermoplastic resin composition comprising: i) a thermoplastic resin having a molecular weight of at least about 40,000 Daltons; and ii) a flow modifier; b) introducing a plurality of carbon fibers having a tensile modulus in the range of from 38 to 48 MSI into the thermoplastic resin composition to form a fiber reinforced thermoplastic composite precursor composition having a melt mass-flow rate ("MFR") of at least 10 g/min when determined under the conditions of 380° C. and 6.6 kg mass; and c) forming a fiber reinforced thermoplastic composite from the precursor composition; and wherein the formed fiber reinforced thermoplastic composite exhibits a specific modulus of at least about 25; wherein the formed fiber reinforced thermoplastic composite exhibits a tensile strength of at least about 226 MPa; and wherein the composite exhibits a heat release profile characterized by a 2 minute total heat release less than about 65 kW min/m$^2$ and a peak heat release rate less than about 65 kW/m$^2$ when measured according to the Ohio State University ("OSU") Heat Release test.

In one aspect, one or more steps on the method can be carried out in an extruder, such as a twin screw extruder, such as a ZSK 40 mm twin screw extruder. In one aspect, the thermoplastic resin and flow modifier can be added to the feed throat of the extruder. The carbon fibers can be added at a later stage of the process or down stream from the feed throat.

In one aspect, the barrel temperature of the extruder can be between about 300° C. and about 400° C., for example between about 360° C. and about 370° C.

In one aspect, the mold temperature can be about 120° C., about 140° C., about 160° C., about 180° C., or about 200° C. For example, the mold temperature can be about 160° C.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

G. Articles of Manufacturer

Also disclosed herein are articles of manufacturer comprising the fiber reinforced thermoplastic composites described herein.

In one aspect, the articles of manufacturer include, but are not limited to parts in aircraft. The fiber reinforced thermoplastic composites can replace metal used in aircraft. Suitable airplane parts include, but are not limited to aircraft food tray arm, armrest, spreader, handles on cabinets, sinks, or storage units.

H. Examples

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The materials shown in Table 1 were used to prepare the composites described herein.

TABLE 2

| # | Item | Batch* 1 | 2 | 3 | 4 |
|---|------|---|---|---|---|
| 1 | PEI-1 | 70 | 60 | — | 48 |
| 2 | PEI-2 | — | — | 60 | — |
| 3 | PEEK | — | — | — | 12 |
| 4 | CF | 30 | 40 | 40 | 40 |

*All component amounts given in as wt % of the total composition.

Table 3 shows the specific gravity, tensile modulus, tensile strength, specific modulus, specific strength and OSU heat release properties for aluminums (Al) and different fiber reinforced thermoplastic composite (such as PEI carbon fiber composites) with and without additives. To pass the OSU heat release (HR) test, a material must have less than 65 kW/$m^2$ peak heat release rate and less than 65 kW*min/$m^2$, for the 2-minute total heat release, for the average of triplicate sample measurements.

Table 3 shows that 30 weight percent (wt %) loading of the carbon fiber in the composite results in that the specific modulus did not meet the target (Batch 1). The compound with 40 wt % carbon fiber in PEI with a molecular wt of 54K satisfied the modulus, strength and OSU heat release performance, but the mass flow rate (MFR) was very low (6 g/10 min); the processing (extrusion and molding) was very difficult at this melt flow rate (Batch 2). The melt flow rate could be manipulated by changing the molecular weight of PEI, but that affected the OSU heat release performance, e.g. the PEI with molecular wt of 31K exhibited improved MFR (15) at 40 wt % CF loading, but it did not pass the OSU test (Batch 3).

TABLE 1

| Abbreviation | Description | Source |
|---|---|---|
| PEI-1 | Ultem 1000; a polyetherimide resin prepared by a condensation reaction with a Mw of about 54,000 Da. | SABIC Innovative Plastics ("SABIC IP") |
| PEI-2 | Ultem 1040A; a polyetherimide prepared by a condensation reaction with a Mw of about 31,000 Da. | SABIC-IP |
| PEEK | Victrex PEEK 90P; a polyetheretherketone polymer prepared by a step growth polymerization reaction with a melt viscosity of about 90 Pa-s. | Victrex USA, Inc. |
| CF | HexTow IM7 intermediate modulus chopped carbon fiber of ~6 mm cut length having a tensile modulus of 40 Msi and a tensile strength of 822 Ksi. | Hexcel Corporation |

1. Composite Batches

Representative composite compositions were prepared using the reactants as shown in Table 2 using materials described in Table 1. The values given under each batch are the amount of each item in pounds that was used in the indicated batch in wt % of the whole composition.

When PEEK 90P was added (12 wt % of total formulation, i.e. 20 wt % of the resin formulation) to formulation 2, there was almost 3-fold increase in melt flow rate and the compound passed all the mechanical and OSU heat release requirements (Batch 4).

TABLE 3

| Material | Specific Gravity | Tensile Modulus (GPa) | Tensile Strength (MPa) | Specific Modulus | Specific Strength | MFR* (g/10 min) | OSU Test (65/65) |
|---|---|---|---|---|---|---|---|
| Die cast Al | 2.81 | 71.7 | 228 | 25.5 | 81.1 | — | — |
| Tempered Al | 2.81 | 71.7 | 572 | 25.5 | 203.6 | — | — |
| Batch 1 | 1.39 | 28.1 | 282 | 20.2 | 202.9 | 10 | 2/42 |
| Batch 2 | 1.44 | 37.7 | 272 | 26.2 | 188.9 | 6 | 1/36 |
| Batch 3 | 1.44 | 36.8 | 265 | 25.6 | 184.0 | 15 | 1/68 |
| Batch 4 | 1.44 | 38.6 | 285 | 26.8 | 197.9 | 16 | 1/39 |

*determined at 380° C., 6.6 kg load.

The various parameters in Table 3 and referenced elsewhere herein were determined as described below. Specific gravity was determined by measuring the ratio of mass of a given volume of material at 23° C. to the same volume of deionized water. The specimen was weighed in the air using an analytical balance and then weighed when immersed in deionized water and in accordance with ASTM D 792. Tensile modulus and tensile strength was measured using a Material Testing System (MTS) from Instron with a test speed: 5 mm/min and carried out in accordance with ASTM D 638. Melt flow rate (MFR) was carried out in accordance with ASTM D 1238 and measured at 380° C. with 6.6 Kg load and 6 min dwell time using an extrusion plastometer from Tinius Olsen.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fiber reinforced thermoplastic composite, comprising a continuous thermoplastic polymer phase comprising:
    a) a polyetherimide having a molecular weight of at least 40,000 Daltons; and a polyetheretherketone having a melt viscosity less than 150 Pascal-seconds (Pa-s) when determined under the conditions of 400° C. and a shear rate of 1000/s; and
    b) a dispersed phase comprising a plurality of polyacrylonitrile-based carbon fibers having a tensile modulus in the range of from 38 to 48 MSI dispersed within the continuous thermoplastic polymer phase; and
    wherein the composite exhibits a specific modulus of at least about 25; wherein the composite exhibits a tensile strength of at least about 226 MPa; wherein the composite exhibits a melt mass-flow rate ("MFR") of at least 10 g/min when determined under the conditions of 380° C. and 6.6 kg mass; and wherein the composite exhibits a heat release profile characterized by a 2 minute total heat release less than about 65 kW min/m$^2$ and a peak heat release rate less than about 65 kW/m$^2$ when measured according to the Ohio State University ("OSU") Heat Release test.

2. The composite of claim 1, wherein the polyetherimide has a molecular weight of at least about 50,000 Daltons.

3. The composite of claim 1, wherein the polyetherimide is present in an amount that does not exceed about 60 wt % of the composite.

4. The composite of claim 1, wherein the polyetherimide is present in an amount in the range of from about 40 wt % to about 60 wt % of the composite.

5. The composite of claim 1, wherein the polyetheretherketone is present in an amount in the range of from about 10 wt % to 60 wt % of the continuous thermoplastic polymer phase.

6. The composite of claim 1, wherein the polyetheretherketone has a melt viscosity less than about 100 Pascal-seconds (Pa-s) when determined under the conditions of 400° C. and a shear rate of 1000/s.

7. The composite of claim 1, wherein the plurality of carbon fibers are present in an amount that is at least about 35 wt % of the total weight of the composite.

8. A fiber reinforced thermoplastic composite, comprising:
    a) a continuous thermoplastic polymer phase comprising:
        i. a polyetherimide having a molecular weight of at least about 40,000 Daltons, wherein the polyetherimide resin is present in the composite in an amount that does not exceed about 60 wt % of the composite;
        ii. a polyetheretherketone having a melt viscosity less than 150 Pascal-seconds (Pa-s) when determined under the conditions of 400° C. and a shear rate of 1000/s, wherein the polyetheretherketone is present in the composite in an amount in the range of from about 10 wt % to about 60 wt % of the continuous thermoplastic polymer phase; and
    b) a dispersed phase comprising a plurality of polyacrylonitrile-based carbon fibers having a tensile modulus in the range of from 38 to 48 MSI dispersed within the continuous thermoplastic polymer phase, wherein the plurality of polyacrylonitrile-based carbon fibers are present in an amount that is at least about 35 wt % of the total weight of the composite.

9. The composite of claim 8, wherein the composite exhibits a specific modulus of at least about 25; wherein the composite exhibits a tensile strength of at least about 226 MPa; wherein the composite exhibits a melt mass-flow rate ("MFR") of at least 10 g/min when determined under the conditions of 380° C. and 6.6 kg mass; and wherein the composite exhibits a heat release profile, as measured according to the Ohio State University ("OSU") Heat Release test, characterized by a 2 minute total heat release rate less than 65 kW min/m$^2$ and a peak heat release less than 65 kW/m$^2$.

* * * * *